United States Patent [19]

Townsend

[11] Patent Number: 5,651,554
[45] Date of Patent: Jul. 29, 1997

[54] NON-ABRADING GASKET ASSEMBLY

[76] Inventor: Newton A. Townsend, 585 Arthur St., Woodburn, Oreg. 97071

[21] Appl. No.: 478,789

[22] Filed: Jun. 7, 1995

[51] Int. Cl.⁶ .................................................. F16J 15/00
[52] U.S. Cl. ...................... 277/235 R; 277/227; 431/326
[58] Field of Search .................................. 277/227, 233, 277/235 R, 70, 235 A, 235 B; 431/7, 326, 328, 329

[56] References Cited

U.S. PATENT DOCUMENTS

| | | | |
|---|---|---|---|
| 3,415,556 | 12/1968 | Dryden | 277/235 |
| 3,914,490 | 10/1975 | Fusiek | 277/235 R |
| 4,272,238 | 6/1981 | Smith | 431/328 |
| 4,363,623 | 12/1982 | Brune | 431/166 |
| 4,913,951 | 4/1990 | Pitolaj | 277/235 R |
| 5,137,583 | 8/1992 | Parent et al. | 431/328 |
| 5,190,610 | 3/1993 | Ek | 156/89 |

*Primary Examiner*—Daniel G. DePumpo

[57] ABSTRACT

A non-abrading gasket assembly comprised of an upper ceramic fiber gasket having a generally rectangular configuration. The upper ceramic gasket has a hollow opening within joined long edges and short edges thereof. A lower ceramic fiber gasket has a generally rectangular configuration. The lower ceramic gasket has a hollow opening within joined long edges and short edges thereof. The lower ceramic fiber gasket and the upper ceramic fiber gasket have identical dimensions. The device contains an interior steel gasket having a generally rectangular configuration. The steel gasket has a plurality of apertures formed therethrough inwardly around a peripheral edge thereof. The steel gasket has a downwardly extending aperture formed through a central portion thereof. The interior steel gasket is dimensioned to be coupled between the upper ceramic fiber gasket and the lower ceramic fiber gasket.

3 Claims, 3 Drawing Sheets

5,651,554

NON-ABRADING GASKET ASSEMBLY

BACKGROUND OF THE INVENTION

1. Field of the Invention

The present invention relates to a non-abrading gasket assembly and more particularly pertains to providing an assembly between rough parts of a gas infra red burner with a non-abrading gasket assembly.

2. Description of the Prior Art

The use of infra red burners is known in the prior art. More specifically, infra red burners heretofore devised and utilized for the purpose of radiantly heating are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,110,287 to Macpherson et al. discloses an infra-red burner system for furnaces.

U.S. Pat. No. 5,306,140 to Smith discloses an infra-red generation.

U.S. Pat. No. 3,790,333 to padovani et al. discloses an infra-red burner.

U.S. Pat. No. 4,272,238 to Smith discloses an infra-red heating and burners.

U.S. Pat. No. 4,435,155 to Vigneau discloses an infra-red radiant burner.

While these devices fulfill their respective, particular objective and requirements, the aforementioned patents do not describe a non-abrading gasket assembly for providing an assembly between rough parts of a gas infra red burner.

In this respect, the non-abrading gasket assembly according to the present invention substantially departs from the conventional concepts and designs of the prior art, and in doing so provides an apparatus primarily developed for the purpose of providing an assembly between rough parts of a gas infra red burner.

Therefore, it can be appreciated that there exists a continuing need for new and improved non-abrading gasket assembly which can be used for providing an assembly between rough parts of a gas infra red burner. In this regard, the present invention substantially fulfills this need.

SUMMARY OF THE INVENTION

In the view of the foregoing disadvantages inherent in the known types of infra red burners now present in the prior art, the present invention provides an improved non-abrading gasket assembly. As such, the general purpose of the present invention, which will be described subsequently in greater detail, is to provide a new and improved non-abrading gasket assembly and method which has all the advantages of the prior art and none of the disadvantages.

To attain this, the present invention essentially comprises an upper ceramic fiber gasket having a generally rectangular configuration. The upper ceramic gasket has two long edges and two short edges together joined end to end thereby forming the upper ceramic gasket. The upper ceramic gasket has a hollow opening within the joined two long edges and short edges thereof. The device contains a lower ceramic fiber gasket having a generally rectangular configuration. The lower ceramic gasket has two long edges and two short edges together joined end to end thereby forming the lower ceramic gasket. The lower ceramic gasket has a hollow opening within the joined two long edges and short edges thereof. The lower ceramic fiber gasket and the upper ceramic fiber gasket have identical dimensions. The device contains an interior steel gasket having a generally rectangular configuration. The steel gasket has a plurality of apertures formed therethrough inwardly around a peripheral edge thereof. The steel gasket has a downwardly extending spacer formed through a central portion thereof. The interior steel gasket is dimensioned to be coupled between the upper ceramic fiber gasket and the lower ceramic fiber gasket.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved non-abrading gasket assembly which has all the advantages of the prior art infra red burners and none of the disadvantages.

It is another object of the present invention to provide a new and improved non-abrading gasket assembly which may be easily and efficiently manufactured and marketed.

It is a further object of the present invention to provide a new and improved non-abrading gasket assembly which is of durable and reliable construction.

An even further object of the present invention is to provide a new and improved non-abrading gasket assembly which is susceptible of a low cost of manufacture with regard to both materials and labor, and which accordingly is then susceptible of low prices of sale to the consuming public, thereby making such a non-abrading gasket assembly economically available to the buying public.

Still yet another object of the present invention is to provide a new and improved non-abrading gasket assembly which provides in the apparatuses and methods of the prior art some of the advantages thereof, while simultaneously overcoming some of the disadvantages normally associated therewith.

Even still another object of the present invention is to provide a new and improved non-abrading gasket assembly for providing an assembly between rough parts of a gas infra red burner.

Lastly, it is an object of the present invention to provide a new and improved non-abrading gasket assembly comprised of an upper ceramic fiber gasket having a generally rectangular configuration. The upper ceramic gasket has a hollow opening within joined long edges and short edges thereof. A lower ceramic fiber gasket has a generally rectangular configuration. The lower ceramic gasket has a hollow opening within joined long edges and short edges thereof. The lower ceramic fiber gasket and the upper ceramic fiber gasket have identical dimensions. The device contains an interior steel gasket having a generally rectangular configuration. The steel gasket has a plurality of apertures formed therethrough inwardly around a peripheral edge thereof. The steel gasket has a downwardly extending aperture formed through a central portion thereof. The interior steel gasket is dimensioned to be coupled between the upper ceramic fiber gasket and the lower ceramic fiber gasket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
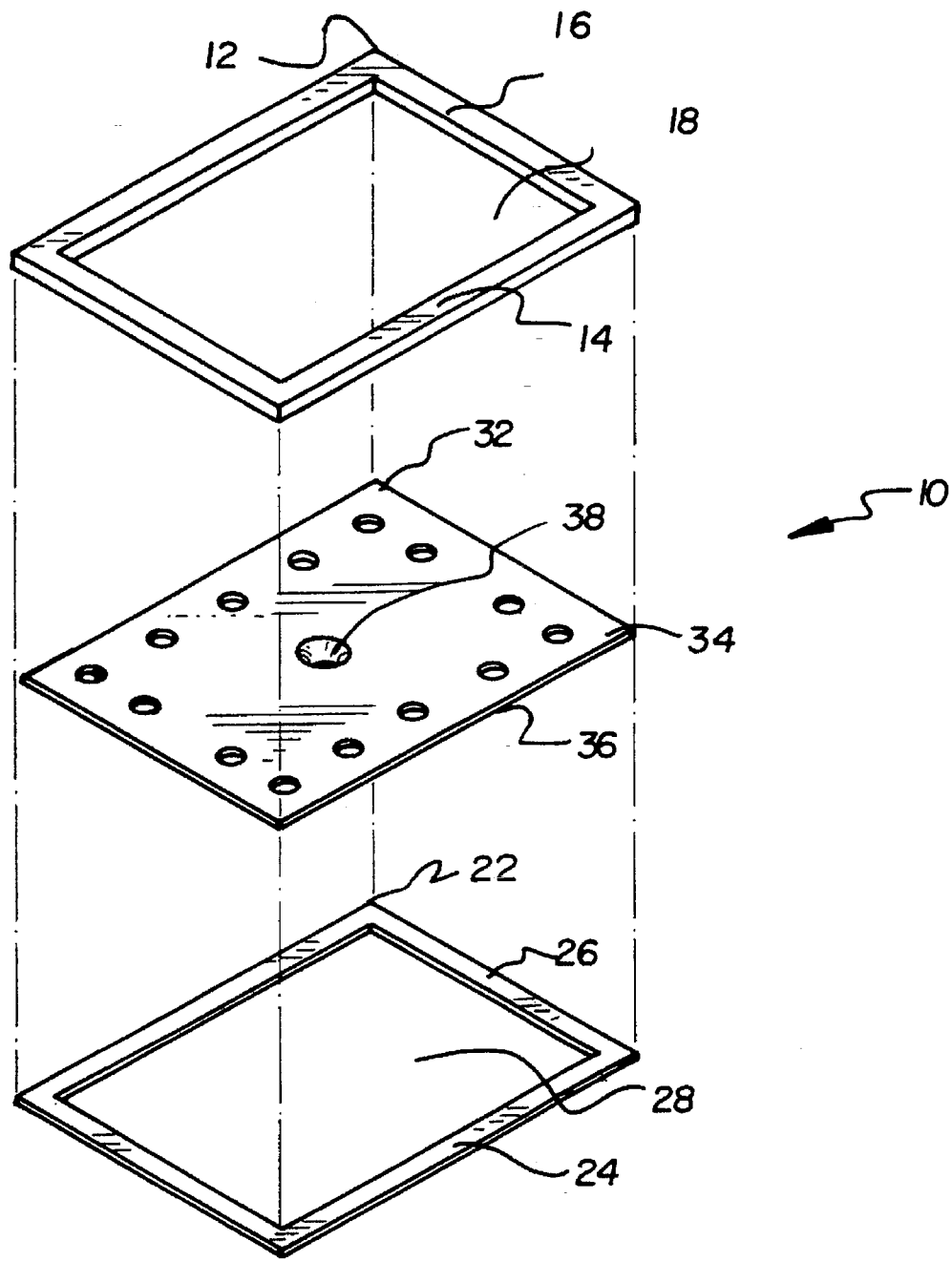
FIG. 1 is a perspective view of the preferred embodiment of the non-abrading gasket assembly constructed in accordance with the principles of the present invention.
Figure 2:
FIG. 2 is a side elevation view of the ceramic fiber gasket of the present invention.
Figure 3:
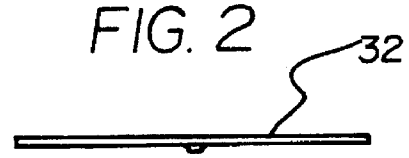
FIG. 3 is a side elevation view of the steel gasket of the present invention.
Figure 4:
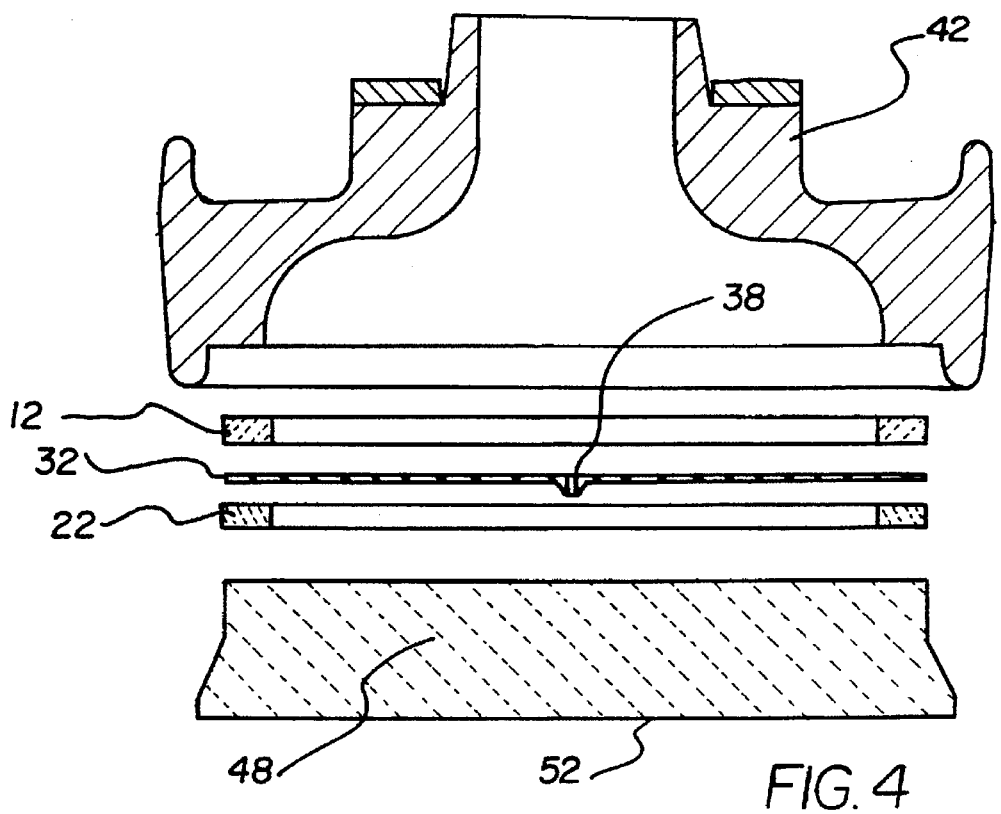
FIG. 4 is a side sectional view of a gas infra red burner assembly particularly illustrating of the gasket assembly positioned between the permeable ceramic block and the rough casting of a gas infra red burner.
Figure 5:
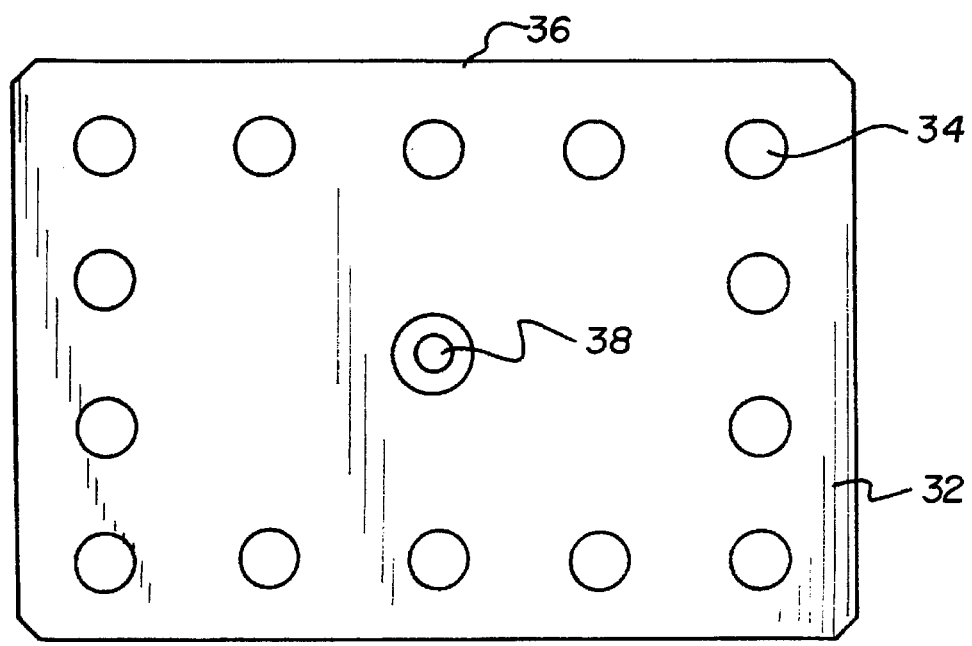
FIG. 5 is a plan view of the steel gasket of the present invention.
Figure 6:
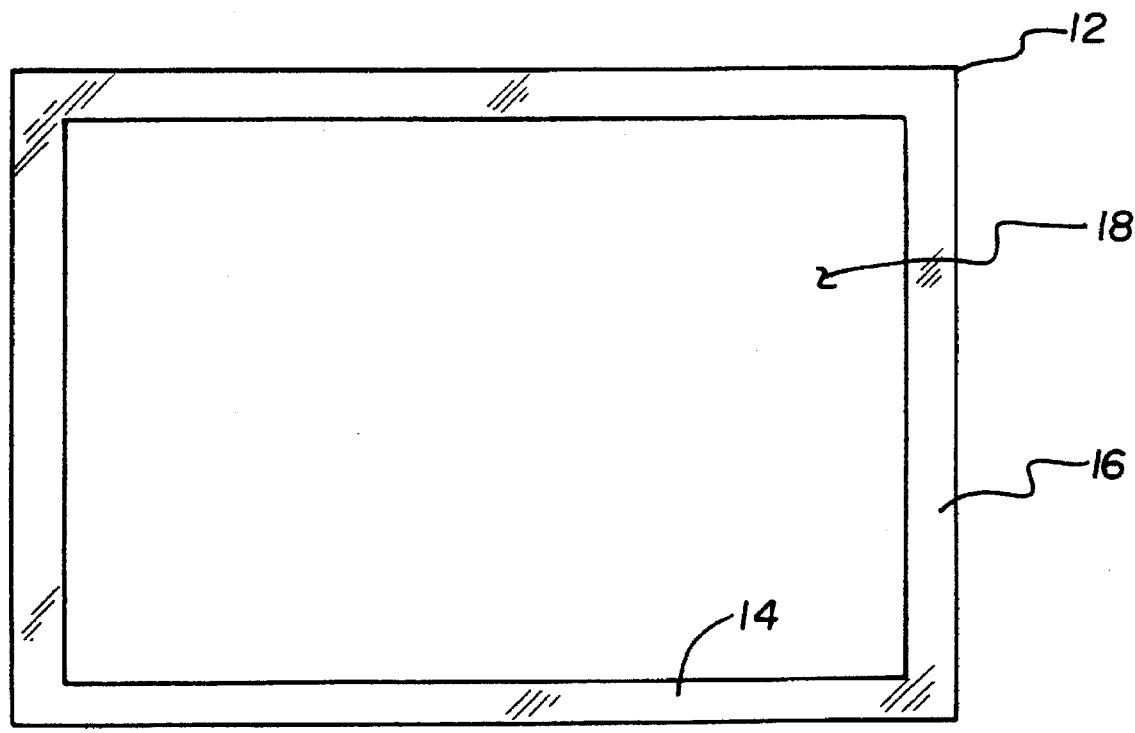
FIG. 6 is a plan view of one of the two ceramic fiber gaskets of the present invention.
Figure 7:
FIG. 7 is a front elevation view of the ceramic fiber gasket of the present invention.
Figure 8:
FIG. 8 is a front elevation view of the steel gasket of the present invention.

With reference now to the drawings, and in particular, to FIG. 1 thereof, the preferred embodiment of the new and improved non-abrading gasket assembly embodying the principles and concepts of the present invention and generally designated by the reference number 10 will be described.

Specifically, it will be noted in the various Figures that the device relates to a new and improved non-abrading gasket assembly for providing an assembly between rough parts of a gas infra red burner. In its broadest context, the device consists of an upper ceramic fiber gasket, a lower ceramic fiber gasket, and an interior steel gasket. Such components are individually configured and correlated with respect to each other so as to attain the desired objective.

The first component of the device 10 is an upper ceramic fiber gasket 12. The upper ceramic fiber gasket 12 has a generally rectangular configuration. The upper ceramic gasket 12 has two long edges 14 and two short edges 16 together joined end to end thereby forming the upper ceramic gasket 12. The upper ceramic gasket 12 has a hollow opening 18 within the joined two long edges 14 and short edges 16 thereof. The upper ceramic fiber gasket 12 is not limited in size, shape, or composition so as not to limit the effectiveness of the device 10. Ceramic is the preferred composition because of its ability to expand under intense heat. Other materials which expand under such intense heat may also be utilized.

The second component of the device 10 is a lower ceramic fiber gasket 22. The lower ceramic fiber gasket 22 has a generally rectangular configuration. The lower ceramic gasket 22 has two long edges 24 and two short edges 26 together joined end to end thereby forming the lower ceramic gasket 22. The lower ceramic gasket 22 has a hollow opening 28 within the joined two long edges 24 and short edges 26 thereof. The lower ceramic fiber gasket 22 and the upper ceramic fiber gasket 12 have identical dimensions. As with the upper ceramic fiber gasket 12, the lower ceramic fiber gasket 22 is not limited in size, shape, or composition so as not to limit the effectiveness of the device 10. Ceramic is the preferred composition because of its ability to expand under intense heat. Other materials which expand under such intense heat may also be utilized.

The final component of the device 10 is an interior steel gasket 32. The interior steel gasket 32 has a generally rectangular configuration. The steel gasket 32 has a plurality of apertures 34 formed therethrough inwardly around a peripheral edge 36 thereof. The steel gasket 32 has an aperture 38 centrally located therein which is defined by downwardly curved edge portions of the steel gasket. The interior steel gasket 32 is dimensioned to be coupled between the upper ceramic fiber gasket 12 and the lower ceramic fiber gasket 22. The interior steel gasket 32 and the upper and lower ceramic fiber gaskets 12, 22 have different rates of expansion. As a burner heats and cools, a scuffing action occurs at their juncture. As a result gasket life is short. Smooth surfaces of the interior steel gasket 32 provides a non-abrasive surface for the upper and lower ceramic fiber gaskets 12, 22 to slide on as they expand at different rates.

Utilization of the above mentioned components involves the use of other components as well. Such a component is a steel casting 42. The steel casting 42 has a lower edge 44. The lower edge 44 is dimensioned to receive the upper ceramic fiber gasket 12 therein. Also included is a permeable ceramic block 48. The ceramic block 48 has an upper surface 50 and a lower surface 52. The upper surface 50 receives the lower ceramic fiber gasket 22 thereon. The steel casting 42 and the permeable ceramic block 48 form a means for allowing flow of gas air mixtures through the aforementioned components.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A non-abrading gasket assembly for providing an assembly between rough parts of a gas infra red burner comprising, in combination:

an upper ceramic fiber gasket having a generally rectangular configuration, the upper ceramic gasket having two long edges and two short edges together joined end to end thereby forming the upper ceramic gasket, the upper ceramic gasket having a hollow opening within the joined two long edges and short edges thereof;

a lower ceramic fiber gasket having a generally rectangular configuration, the lower ceramic gasket having two long edges and two short edges together joined end to end thereby forming the lower ceramic gasket, the lower ceramic gasket having a hollow opening within the joined two long edges and short edges thereof, the lower ceramic fiber gasket and the upper ceramic fiber gasket having substantially identical dimensions; and an interior steel gasket having an outer peripheral edge defining a generally rectangular configuration, the steel gasket having a plurality of apertures formed therethrough inwardly of the outer peripheral edge thereof in locations aligned with the hollow openings of the upper and lower ceramic fiber gaskets for permitting gas flow therethrough, the steel gasket having an aperture formed through a central portion thereof and defined by downwardly curved edge portions of the steel gasket, the interior steel gasket being dimensioned to be coupled between the upper ceramic fiber gasket, and the lower ceramic fiber gasket.

2. A non-abrading gasket assembly for providing an assembly between rough parts of a gas infra red burner comprising, in combination:

an upper ceramic fiber gasket having a generally rectangular configuration, the upper ceramic gasket having a hollow opening within joined long edges and short edges thereof;

a lower ceramic fiber gasket having a generally rectangular configuration, the lower ceramic gasket having a hollow opening within joined long edges and short edges thereof, the lower ceramic fiber gasket and the upper ceramic fiber gasket having substantially identical dimensions; and an interior steel gasket having an outer peripheral edge defining a generally rectangular configuration, the steel gasket having a plurality of apertures formed therethrough inwardly of the outer peripheral edge thereof in locations aligned with the hollow openings of the upper and lower ceramic fiber gaskets for permitting gas flow therethrough, the steel gasket having an aperture formed through a central portion thereof and defined by downwardly curved perimeter edge portions of the steel gasket, the interior steel gasket being dimensioned to be coupled between the upper ceramic fiber gasket and the lower ceramic fiber gasket.

3. The gasket assembly of claim 1 in combination with a steel casting having a lower edge dimensioned to receive the upper ceramic fiber gasket therein, and in further combination with a permeable ceramic block, the ceramic block having an upper surface and a lower surface, the upper surface receiving the lower ceramic fiber gasket thereon, the steel casting and the permeable ceramic block forming a means for allowing flow of gas air mixtures.

\* \* \* \* \*